US012582875B1

(12) United States Patent
Pedry

(10) Patent No.: US 12,582,875 B1
(45) Date of Patent: Mar. 24, 2026

(54) CLIMBING DEVICE

(71) Applicant: Phillip Pedry, Spearfish, SD (US)

(72) Inventor: Phillip Pedry, Spearfish, SD (US)

( * ) Notice: Subject to any disclaimer, the term of this patent is extended or adjusted under 35 U.S.C. 154(b) by 79 days.

(21) Appl. No.: 18/419,115

(22) Filed: Jan. 22, 2024

Related U.S. Application Data

(60) Provisional application No. 63/481,469, filed on Jan. 25, 2023.

(51) Int. Cl.
*A63B 29/02* (2006.01)
*F16B 45/02* (2006.01)

(52) U.S. Cl.
CPC ............ *A63B 29/02* (2013.01); *F16B 45/023* (2021.05); *F16B 45/026* (2021.05)

(58) Field of Classification Search
CPC ....... A63B 29/02; F16B 45/023; F16B 45/026
USPC ...................................................... 248/231.9
See application file for complete search history.

(56) References Cited

U.S. PATENT DOCUMENTS

| | | | | |
|---|---|---|---|---|
| 6,601,274 B2 * | 8/2003 | Gartsbeyn | ............. | F16B 45/023 |
| | | | | 24/599.8 |
| 7,513,334 B2 * | 4/2009 | Calver | ................. | B66D 1/7415 |
| | | | | 182/133 |
| 7,647,677 B2 * | 1/2010 | Casebolt | ............... | F16B 45/026 |
| | | | | 24/600.1 |
| 8,209,823 B2 * | 7/2012 | Apicella | ................... | A62B 1/14 |
| | | | | 24/130 |
| 8,443,495 B2 | 5/2013 | Schwappach et al. | | |

| | | | | |
|---|---|---|---|---|
| 8,474,112 B2 | 7/2013 | Thompson | | |
| 9,322,428 B2 | 4/2016 | Perner | | |
| 11,293,478 B2 * | 4/2022 | Walker | ................. | F16B 45/023 |
| 12,473,943 B2 * | 11/2025 | Adelman | ............... | A44B 15/00 |
| 2008/0005876 A1 | 1/2008 | Christianson | | |
| 2011/0284323 A1 * | 11/2011 | Ayre | ........................ | A62B 1/14 |
| | | | | 182/5 |

(Continued)

FOREIGN PATENT DOCUMENTS

| | | |
|---|---|---|
| EP | 1666104 | 6/2006 |
| EP | 1710456 | 3/2008 |
| EP | 1927767 | 1/2011 |

OTHER PUBLICATIONS

"SRT series #2—Canopy anchors" available online at https://www.youtube.com/watch?v=JkR-IU1jva0&t=2s, Feb. 12, 2016.

(Continued)

*Primary Examiner* — Anita M King
(74) *Attorney, Agent, or Firm* — Trenner Law Firm, LLC; Mark Trenner

(57) ABSTRACT

A climbing device is disclosed as it may be implemented in an example for providing a canopy anchor for a tree. An example of the climbing device includes a unitary body. An eyelet is formed through an upper body portion of the unitary body for attaching a first rope. A secondary opening is formed through an upper body portion of the unitary body for attaching a second rope. A third opening is formed in the unitary body for receiving a third rope. A fourth opening is made and is defined by a mouth of the slot leading an upper curved portion leading to a lower curved portion leading to a rope resting portion for the fourth rope. A gate can be closed across the mouth of the slot. The unitary body is loaded upon its major axis thus positioning the rope within the rope resting portion of the slot.

17 Claims, 20 Drawing Sheets

(56) References Cited

U.S. PATENT DOCUMENTS

2017/0121154 A1* 5/2017 Costa ........................ B66C 1/10

OTHER PUBLICATIONS

"Friction Savers for Tree Climbing Compared—TreeSthttps://www.youtube.com/watch?v=F3sHpFJ8cukuff.com" available online at Jan. 18, 2019.

Treestuff.com "Tree Climbing Gear" printed from https://www.treestuff.com/climbing/tree-climbing-gear/ on Jan. 2, 2024 (available earlier).

"Rope Logic Mid-Line Retrievable Redirect—Adam Castro's TreeStuff Customer Review" available at youtube.com/watch?v=h8a8Cc9IMnk, Mar. 2, 2021.

"Mid-line attachable, retrievable redirect | The Tree House" available at https://www.masterblasterhome.com/threads/mid-line-attachable-retrievable-redirect.23771/, Mar. 15, 2021.

Treestuff.com "Rope Logic Retrievable Redirect" available at https://web.archive.org/web/20201126073737/https://www.treestuff.com/rope-logic-retrievable-redirect/, Nov. 26, 2020.

YouTube video screenshots—Petzl "How to Use the Petzl NAJA friction saver—SRS" available at https://www.youtube.com/watch?v=Z19l9N8uoRw Mar. 14, 2023.

YouTube video screenshots—Petzl "How to install and retrieve the Eject using a Moving Rope System" available at https://www.youtube.com/watch?v=VwHKLNIjJx0 Mar. 25, 2021.

* cited by examiner

CLIMBING DEVICE

PRIORITY CLAIM

This application claims the priority filing benefit of U.S. Provisional Patent Application No. 63/481,469 filed Jan. 25, 2023 for "Climbing Device" of Phillip Pedry, hereby incorporated by reference in its entirety as though fully set forth herein.

BACKGROUND

Climbing on a stationary rope system (SRT) requires a rope to pass around an object at the desired height of assent and to be fixed to that object or to pass around that object and back to the ground where it can be fixed. In the case of this climbing device and those methods which are currently used to anchor a single line, the object is a tree in which case the rope must pass around a branch and be fixed to that branch or the rope must pass around the branch and run back down to the ground where it is commonly tied to the base of a tree.

Once the rope is anchored in one of these two ways the climber attaches a belay device to the rope side, opposite to the side which is anchored. The climber then ascends the single line up to the point at which the rope is attached to the branch, or where it passes around the branch and travels back to the anchor point on the ground. Commonly, the climber chooses to maintain the single line in this position (e.g., passing over the branch and anchored at the ground) throughout the remainder of his/her work in the tree.

Having the SRT system passing over the branch and anchored at the base of the tree presents a problem. First, there are two loaded strands of life safety rope passing from the ground to the tie-in point (TIP) back to the ground. This presents a safety concern to the climber. Having one whole length of the SRT system from the TIP to the ground is vulnerable to falling branches and logs, hand saws, pruners, chain saws, power lines, and complacent workers on the ground. Not to mention the climber's own complacency of cutting their own life safety line. In addition, the climber is putting a force potential to 200% of their weight on the TIP, as opposed to the canopy anchor system which would only put a potential force of 100% of his/her weight on the TIP.

If the climber has set the single rope system in the base anchor position where the rope travels around the branch and back down to an anchor on the ground, the following situation can occur. Once the climber has finished the work and descends to the ground, his/her rope has likely passed through multiple redirects (e.g., branches). This consequently adds more friction to the rope when the climber pulls the opposite side of the line out of the tree. The added friction from the redirects requires the climber to add more force to pull the line out of the tree. While pulling the single line from the tree, the climber can damage the tree at the branch crotch at the TIP due to excessive force and friction on the bark and cambium of the tree. The combined friction of the redirects and the TIP contacting the rope in multiple places may require the climber to have an additional teammate to help him/her pull the rope and hardware if any was left at the TIP from the tree.

A common alternative to this method of anchoring the SRT line can be facilitated from the ground by isolating a single TIP from the ground upon using a throw line (small cord) and throw weight. Once the climber has isolated this single branch, he/she can install a cambium saver or friction saver. A cambium saver has two closed rings, one large and one small. Through a series of maneuvers, the climber can pass this cambium saver over the branch and then pass his/her single rope through the small and big ring. Then the climber can tie a knot and attach a carabiner to that knot and pull the line back down to the ground and continue to pull until the knot meets the small ring and is consequently blocked, creating an anchor for the single line which passes through the small and big ring and back to the climber on the ground. The climber can then attach his/her belay device and ascend the line for work in the tree.

The downside to this method is that the climber cannot advance his/her anchor point higher in the tree unless he/she removes his/her belay device and pulls the rope back through the two rings of the anchor to remove the rope from the initial TIP. Once the climber has done this, they have effectively dismantled their entire belay system and must rebuild it again as previously mentioned.

DETAILED DESCRIPTION

Figure 1:
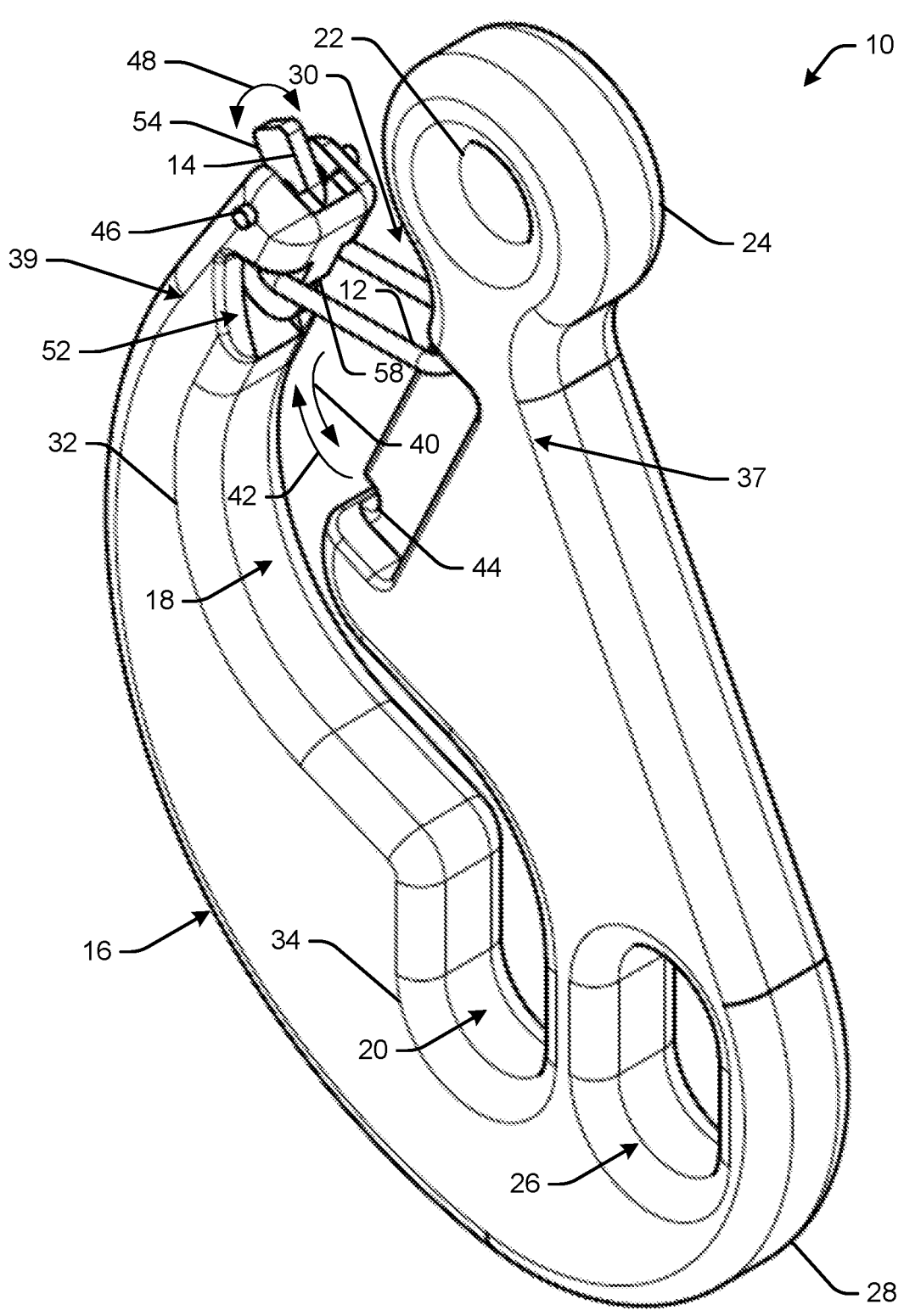
FIG. 1 is a perspective view showing an example climbing device.

Anchors are used throughout "work at height" industries. The climbing device disclosed herein is described with reference to tree climbing and the "work at height industries." It is noted, however, that the climbing device is not limited to any particular end use or use in any particular industry.

During the past decade a technique known as SRT has been recognized as one of the most efficient energy saving climbing techniques to access all parts of the tree for work and recreation activities in the tree(s). The SRT focus has created a whole industry of new gadgets and climbing devices to apply to SRT climbing in an effort to make systems run easier, smoother, quicker and safer. While there are numerous methods of anchoring the single rope in SRT climbing, all of the current anchors and anchoring methods have one or more significant drawbacks regarding efficiency, safety or tree health. There are currently no midline-attachable, retrievable SRT-cambium-saving-canopy-anchors that enables the climber to attach a primary anchor on the rope, while said climber is secured to the same rope suspended in the tree, without having to take a considerable amount of time deconstructing and reconstructing his/her belay system.

The climbing device disclosed herein addresses these and other issues. The techniques described herein can be implemented with a single length of cord, one bound loop cord prusiked to the aforementioned length of rope and a single device in the case of FIG. 13, which configured to block a knot to keep it from passing through the climbing device while in the case of retrieval is configured to catch a retrieval ball in order to retrieve the climbing anchor, or in all other figures a single device which configured to block a knot to keep it from passing through the climbing device, and one carabiner configured to enable a knot to pass through said carabiner upon retrieval.

A climbing device is disclosed as it may be implemented in an example for providing a canopy anchor for a tree. An example of the climbing device includes a unitary body. An eyelet is formed through an upper body portion of the unitary body for attaching a first rope. A secondary opening is formed through a lower body portion of the unitary body for attaching a second rope. A slot is formed in the unitary body for receiving a third rope. And in this case of FIG. 13 another slot to receive a fourth rope. The slot is defined by a mouth of the slot leading an upper curved portion leading to a lower curved portion leading to a rope resting portion for the third rope. A gate can be closed across the mouth of the slot. The unitary body is loaded upon its major axis thus positioning the rope within the rope resting portion of the slot for use as a canopy anchor.

In an example, the climbing device can be installed by the climber into the tree from the ground or aloft in the tree, without deconstructing any belay life safety functions in the climbing systems.

In an example, the climber may place the climbing device around the TIP while aloft in a tree. In this example, the TIP is a tree branch suitable to hold the climbers weight and gear. The climber then clips his/her single line into the climbing device and the carabiner or in the example climbing device of FIG. 13 the rope may be clipped into this alone. The climber then ties a suitable knot into his/her single line just outside the climbing device, thus creating an anchor on the working end passing through the climbing device and out the large carabiner, or in the case of FIG. 13, just the climbing device, then to the climber and his/her belay system.

In an example, the climbing device is configured to trap a single strand of standard life safety rope while also receiving force to its minor axis and major axis, while still meeting safety standards for a minimum breaking strength on life safety devices of its kind.

In an example, the climbing device may be configured to support four separate rope and cordages with applied force on all four strands being received and disbursed through the climbing device's major axis.

In an example, the climbing device may accept a life safety rope manually after which the climbing device automatically traps the rope now contained inside its body by means of an automatic gate(s).

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

Figure 2:
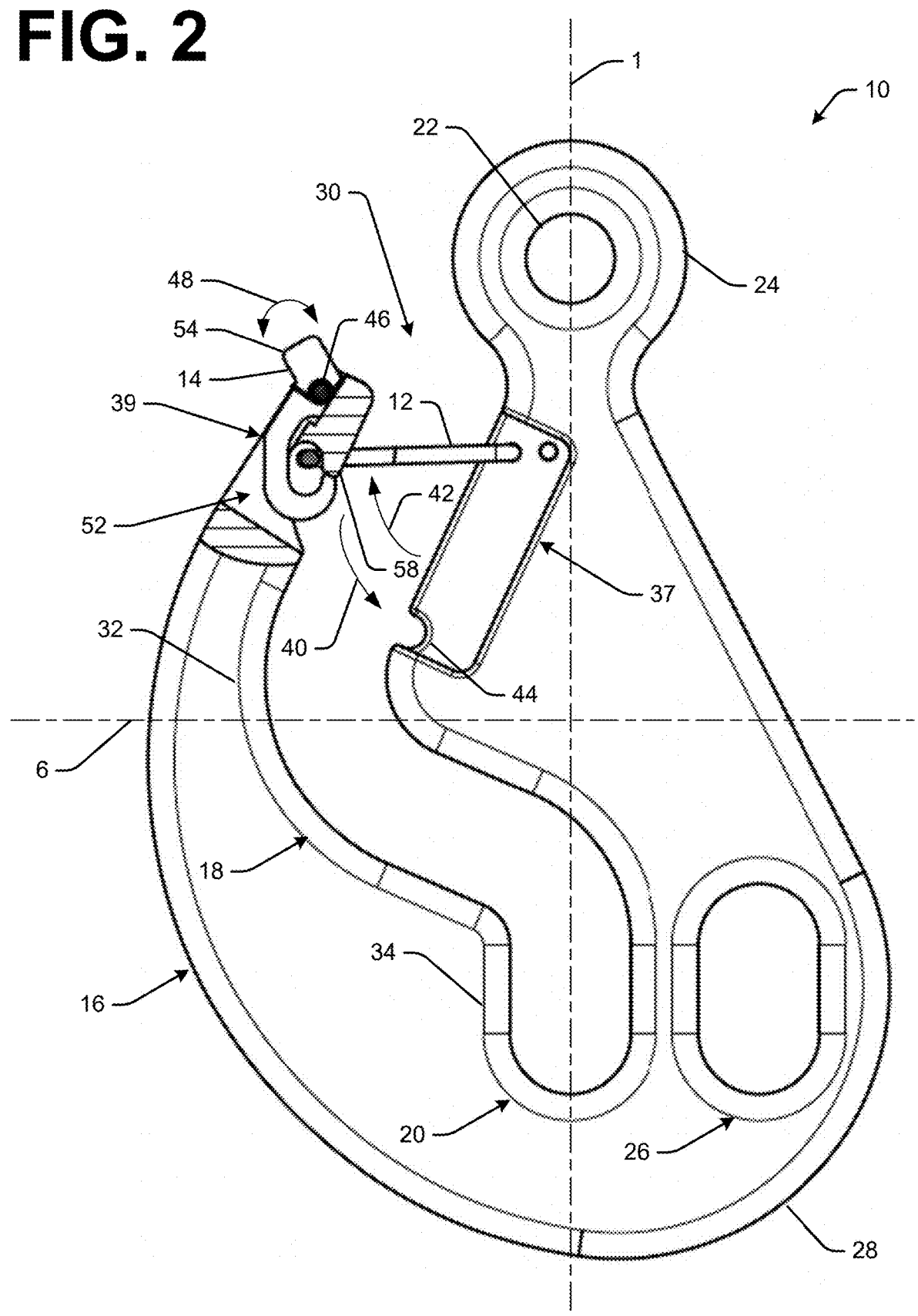
FIG. 2 is a side view of the example climbing device corresponding to FIG. 1.
Figure 3:
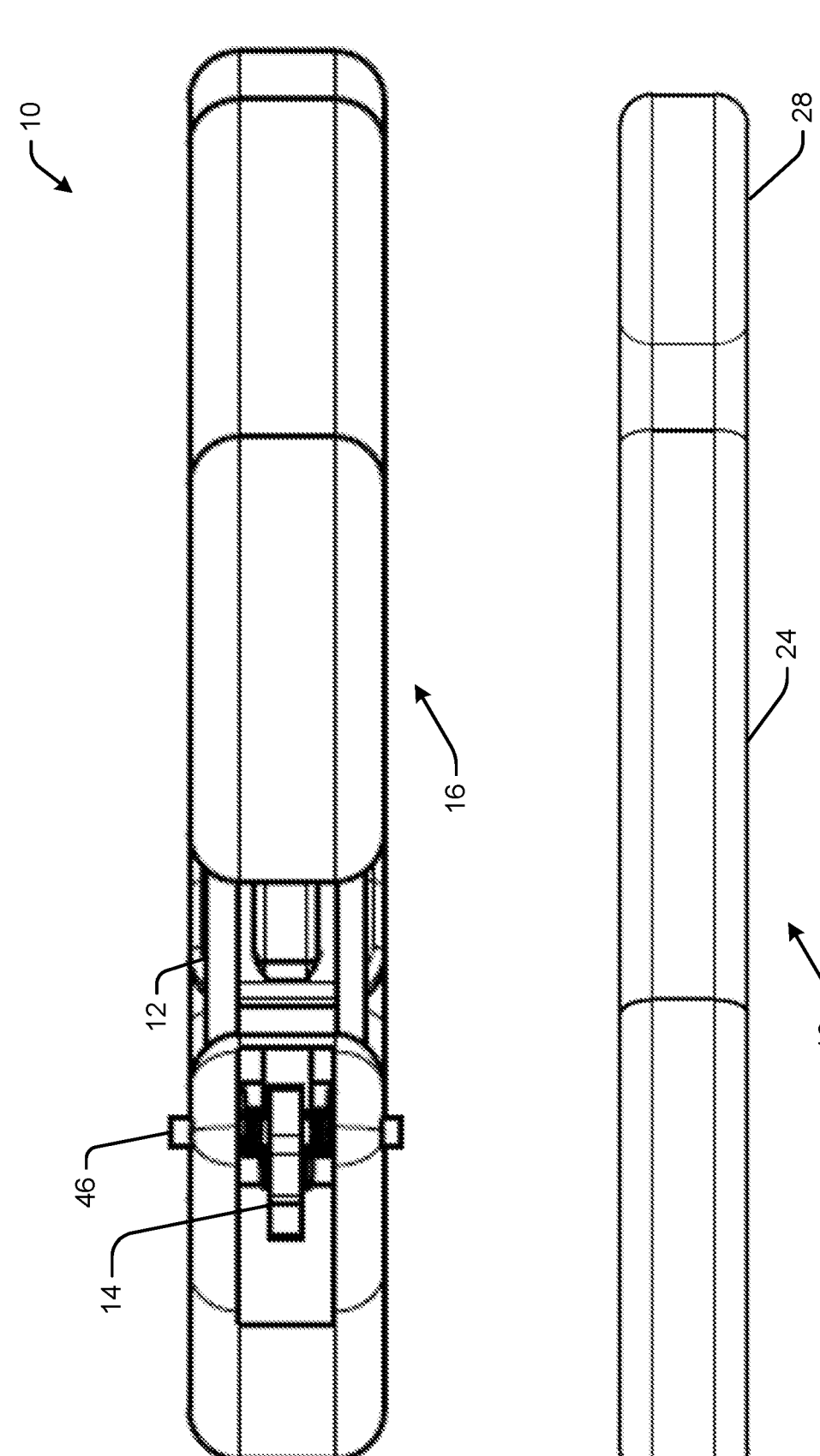
FIG. 3 shows front and rear views of the example climbing device corresponding to FIG. 1.
Figure 4:
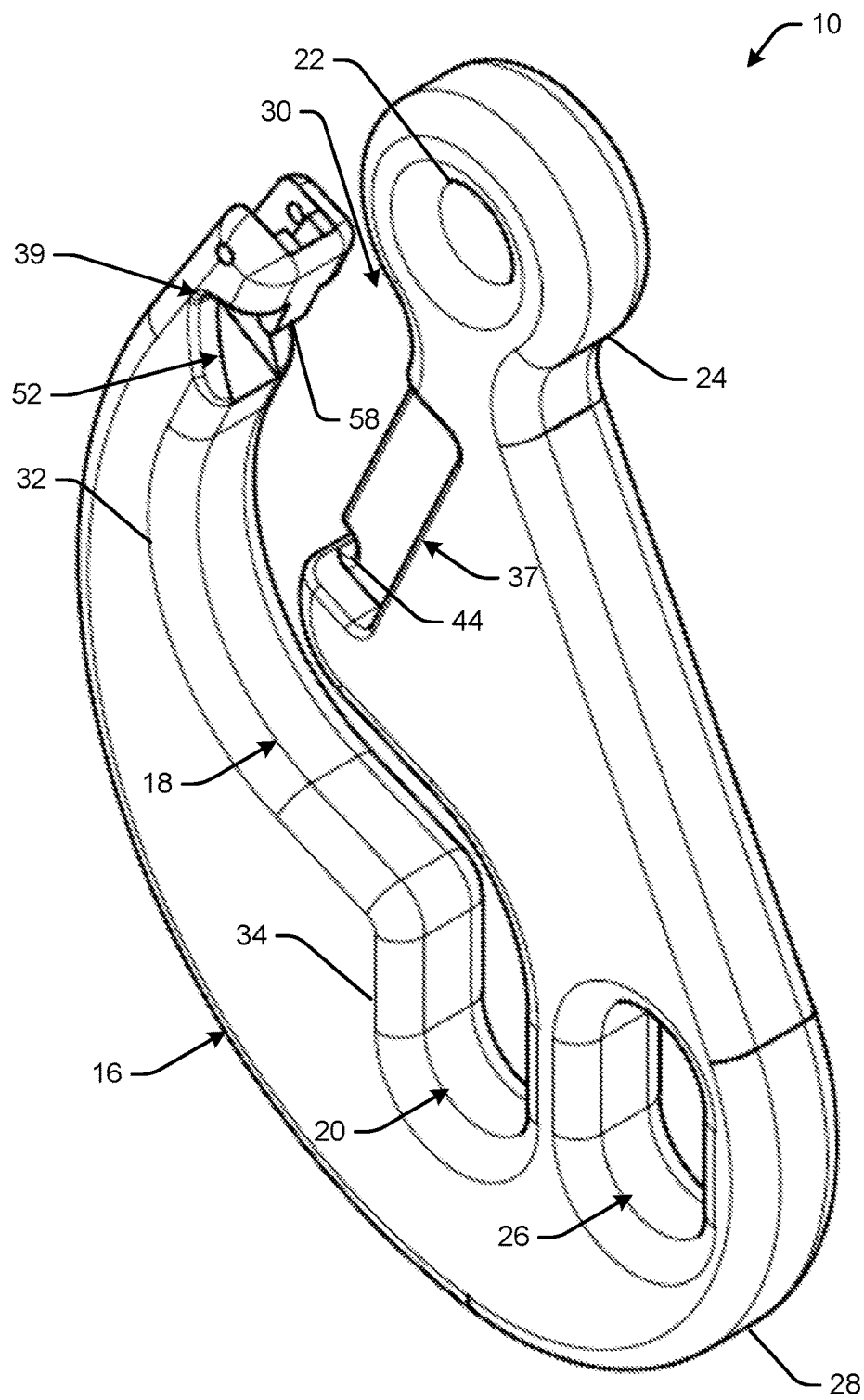
FIG. 4 is a perspective view showing the example climbing device with the gate and latch uninstalled.
Figure 5:
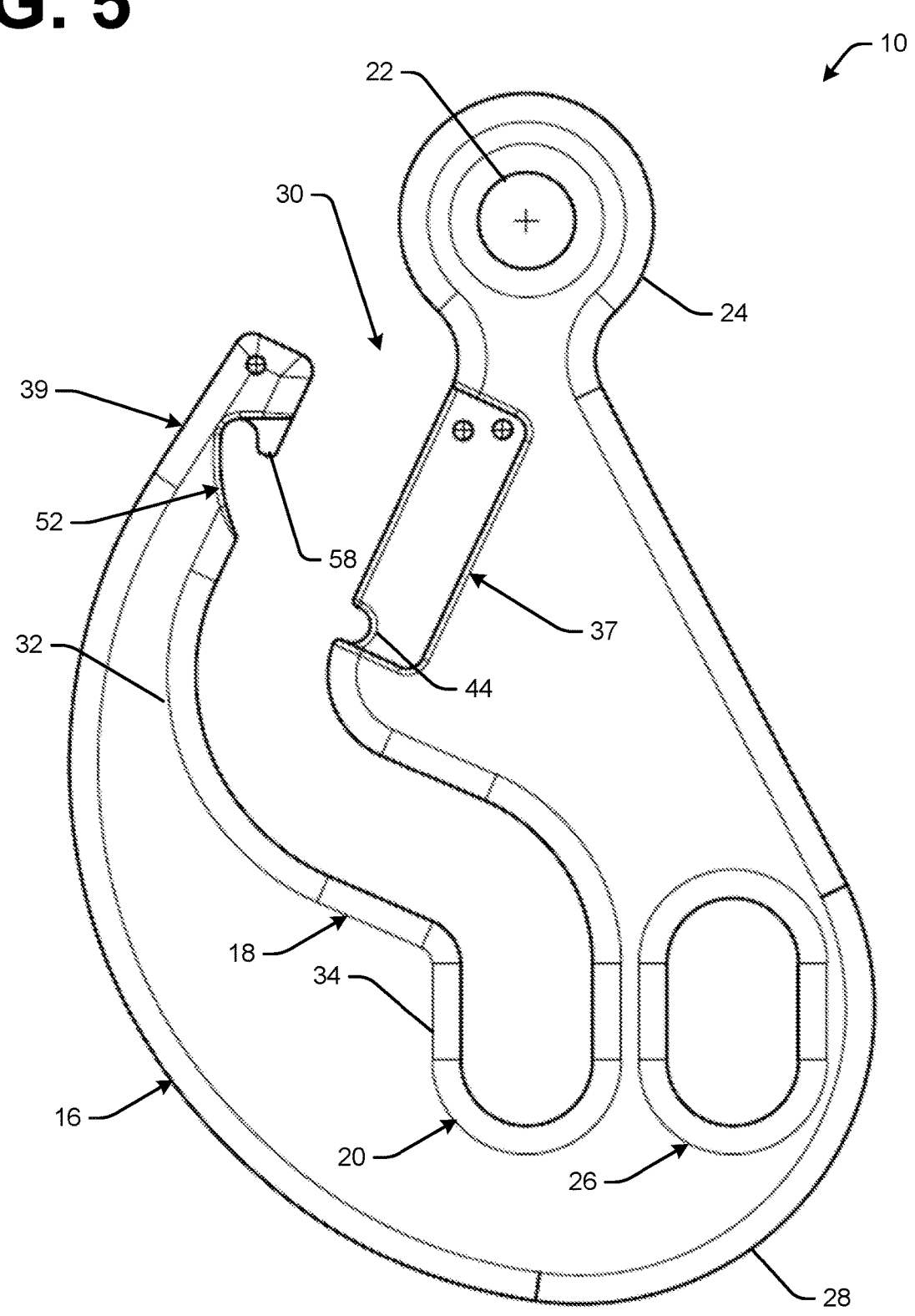
FIG. 5 is a side view of the example climbing device corresponding to FIG. 4.
Figure 6:
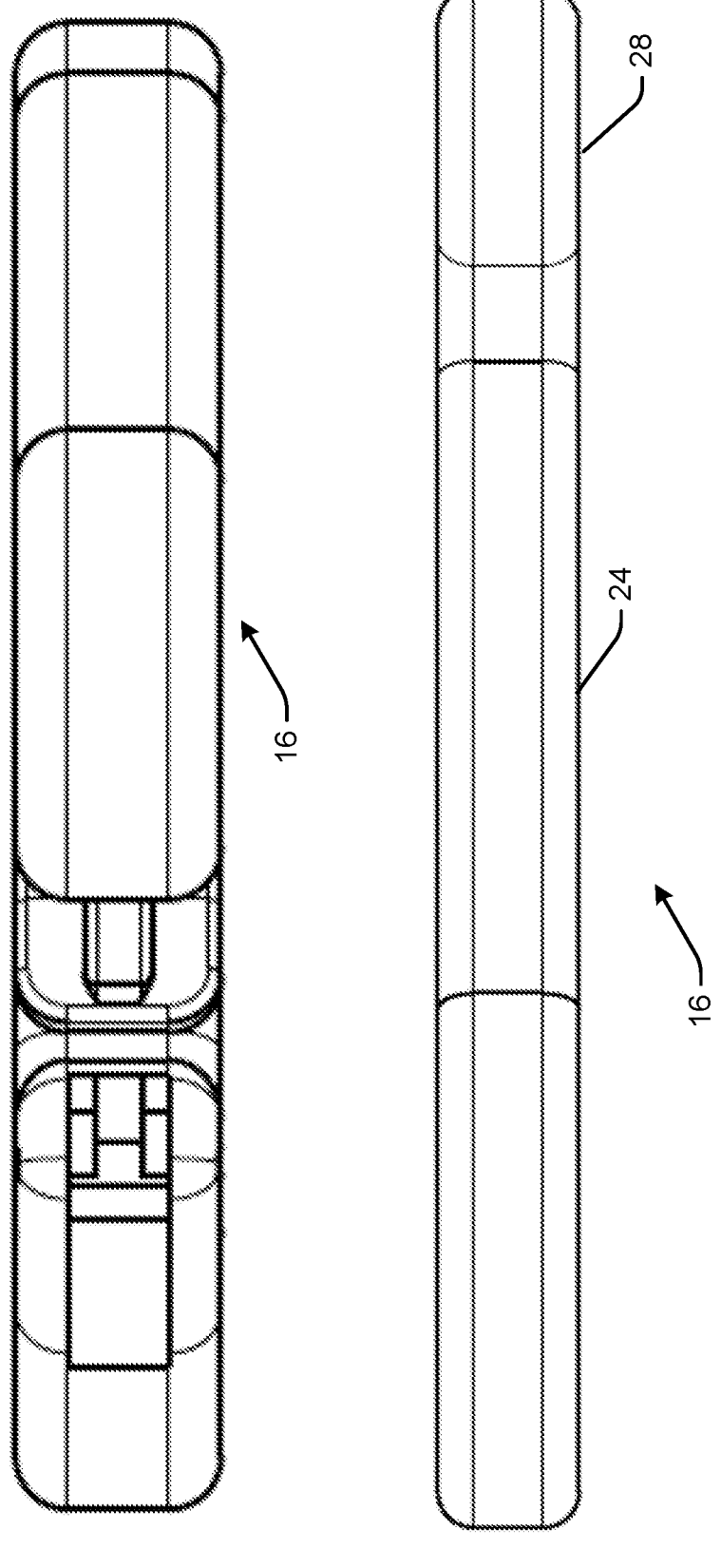
FIG. 6 shows front and rear views of the example climbing device corresponding to FIG. 4.

FIG. 1 is a perspective view showing an example climbing device 10. FIG. 2 is a side view of the example climbing device 10 corresponding to FIG. 1. FIG. 3 shows front and rear views of the example climbing device 10 corresponding to FIG. 1. FIG. 4 is a perspective view showing the example climbing device 10 with the gate 12 and latch 14 uninstalled. FIG. 5 is a side view of the example climbing device 10 corresponding to FIG. 4. FIG. 6 shows front and rear views of the example climbing device 10 corresponding to FIG. 4.

Generally speaking, the climbing device 10 includes a body 16 (e.g., made of an alloy). In an example, the body 16 is one piece (i.e., "unitary") and is configured with a slot 18 for a rope. However, the body 16 is not limited to a unitary structure except when so defined by the claims. A standard life safety rope may be fitted to rest in the bottom or rope resting portion 20 of the slot 18. The climbing device 10 may be loaded upon its major axis 1 (FIG. 2) perpendicular to its minor axis 6, thus necessitating proper positioning of the rope within the climbing device 10 when in use as an anchor. This enables the climbing device 10 to be loaded on its flanks by having a knot tied intentionally in the SRT system on one side of the climbing device 10, while the other side of the rope travels out the opposite side of the climbing device 10 to the worker suspended on the rope end.

With reference to FIGS. 1-4, and as noted above, the climbing device 10 includes a unitary body 16. An eyelet 22 is formed through an upper body portion 24 of the unitary body 16 for attaching a first rope (see, e.g., FIGS. 17-20 for example uses). A secondary opening 26 is formed through a lower body portion 28 of the unitary body 16 for attaching a second rope (see, e.g., FIGS. 17-20 for example uses). The slot 18 is formed in the unitary body 16 for receiving a third rope (see, e.g., FIGS. 17-20 for example uses). The slot 18 is defined by a mouth 30 of the slot leading to an upper curved portion 32, in turn leading to a lower curved portion 34, in turn leading to the rope resting portion 20 for the third rope. It is noted that the curved portions and the resting portions are all part of the same slot, as seen in the drawings.

Gate 12 is provided for closing across the mouth of slot 18. Gate 12 is a safety mechanism to prevent the rope from sliding out of the slot 18, should the climbing device 10 rotate and the rope slide out of the rope resting portion 20. As noted above, the unitary body 16 is loaded upon its major axis 1, thus positioning the rope within the rope resting portion 20 of the slot 18 when in use, for example as an anchor (e.g., canopy anchor) when passed over a branch of a tree and anchored at a base of the tree.

Gate 12 is shown in a closed position in FIGS. 1 and 2. Gate 12 can be moved from the closed position in the direction of arrow 40 into the open position. Gate 12 can also be moved from the open position in the direction of arrow 42 into the closed position. In an example, a detent 44 is formed in the unitary body 16, as seen for example in FIGS. 1 and 2. The detent 44 can be configured to receive the gate 12 when the gate 12 is in an open position so that it is tucked away out of the slot 18 and is less likely to interfere with insertion of the rope in the slot 18.

Figure 7:
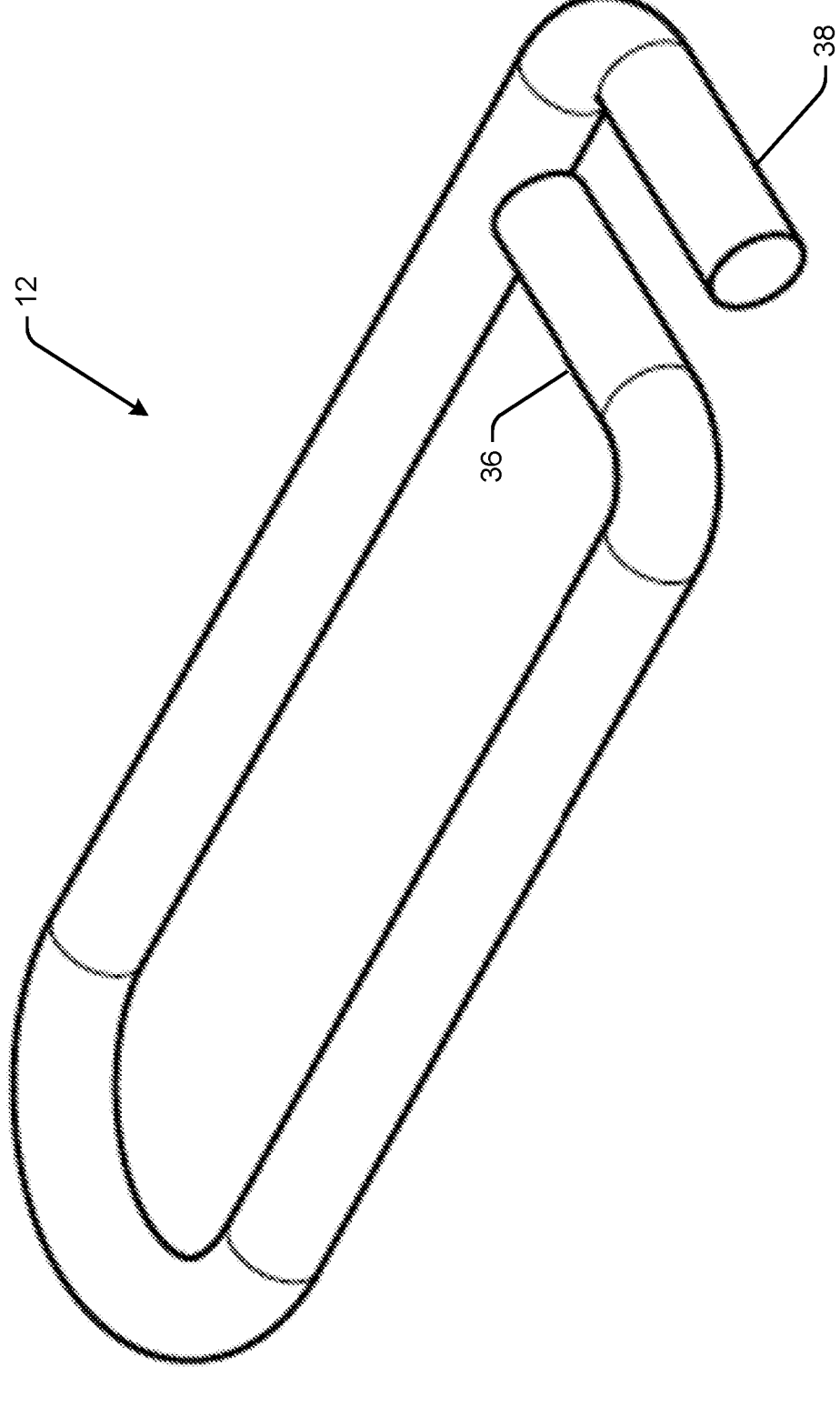
FIG. 7 is a perspective view showing an example gate of the example climbing device.

In an example, gate 12 is a spring gate. FIG. 7 is a perspective view showing an example gate of the example climbing device. The gate 12 shown in FIG. 7 has a first leg 36 offset from a second leg 38. In an example, the first and second legs 36, 38 of the spring gate 12 are mounted on a first side 37 of the mouth 30 of the slot 18 adjacent to the eyelet 22. When the first and second legs 36, 38 of the spring gate 12 are attached into holes or openings formed in the unitary body 16, as shown for example in FIGS. 1 and 2, this offset of the first leg 36 and second leg 38 biases the spring gate 12 in the direction illustrated by arrow 40 in FIG. 1 toward an open position. The open position 40 allows a rope to slide into the mouth 30 of the slot 18. Likewise, the spring gate 12 will move automatically into its resting position in the direction illustrated by arrow 42 in FIG. 1 into the closed position that is shown in FIGS. 1 and 2. It is noted that the gate 12 shown in FIG. 7 is only illustrative, and not intended to be limiting except when so defined in the claims. Any suitable gate structure and attachment of the gate to the unitary body 16 may be provided.

Figure 8:
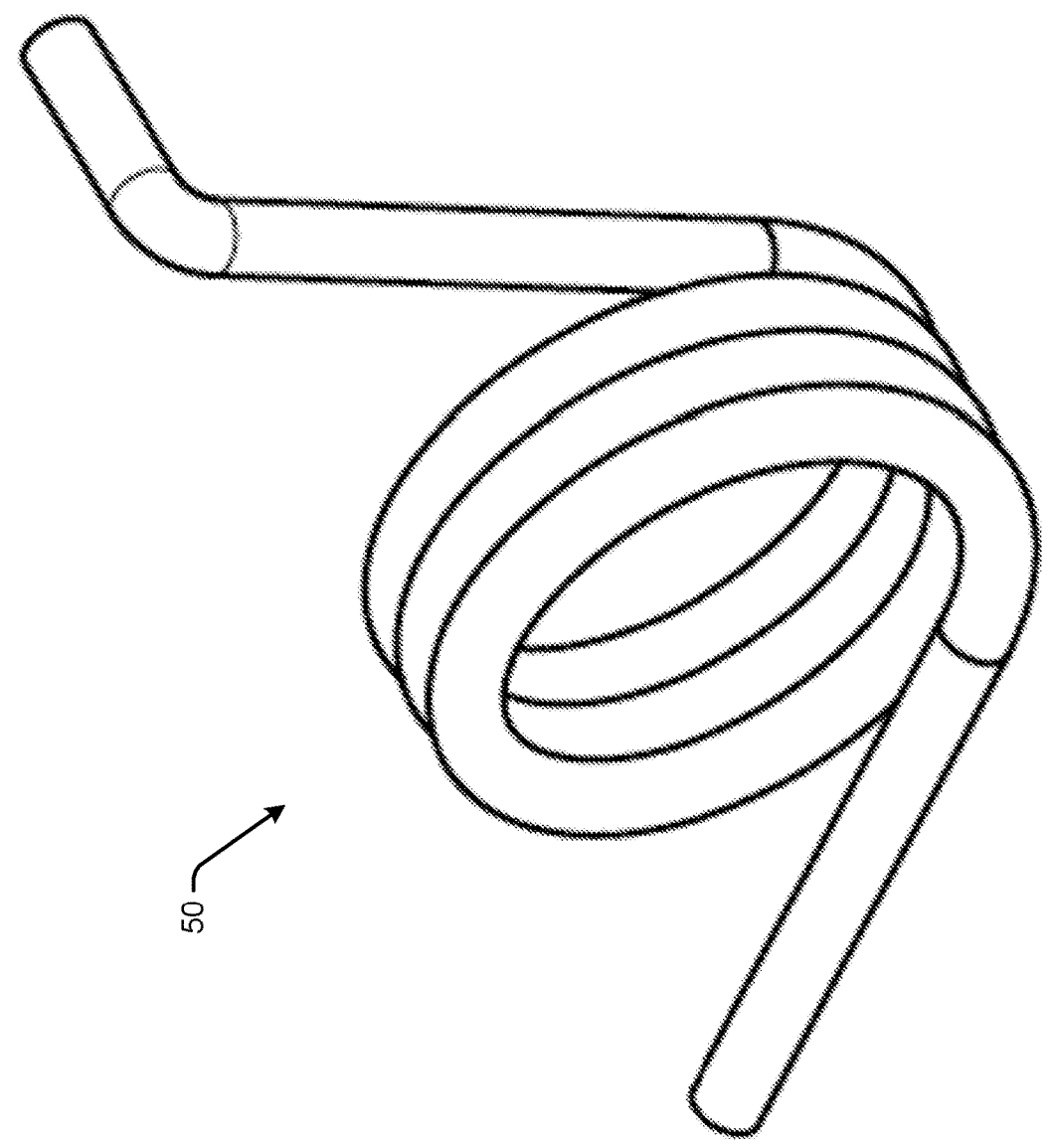
FIG. 8 is a perspective view showing an example spring of the example climbing device.

In an example, the latch 14 is pivotally mounted on a second side 39 of the mouth 30 of the slot 18. The latch 14 can be pivotally mounted, for example with pin 46 through opening 55 seen in FIG. 9, or other suitable mounting assembly. The latch 14 rotates in the directions indicated by arrows 48 between an open position (releasing the gate 12) and a closed position (to retain the gate 12). In an example, the latch 14 is spring biased. FIG. 8 is a perspective view showing an example spring 50 of the example climbing device 10. In an example, the spring 50 is installed in the receiver opening 52 to bias the latch 14 in the closed position. The latch 14 has a lever 54 to manually rotate the latch 14 against the bias of the spring 50 to move the latch 14 into the open position and release the gate 12.

Figure 9:
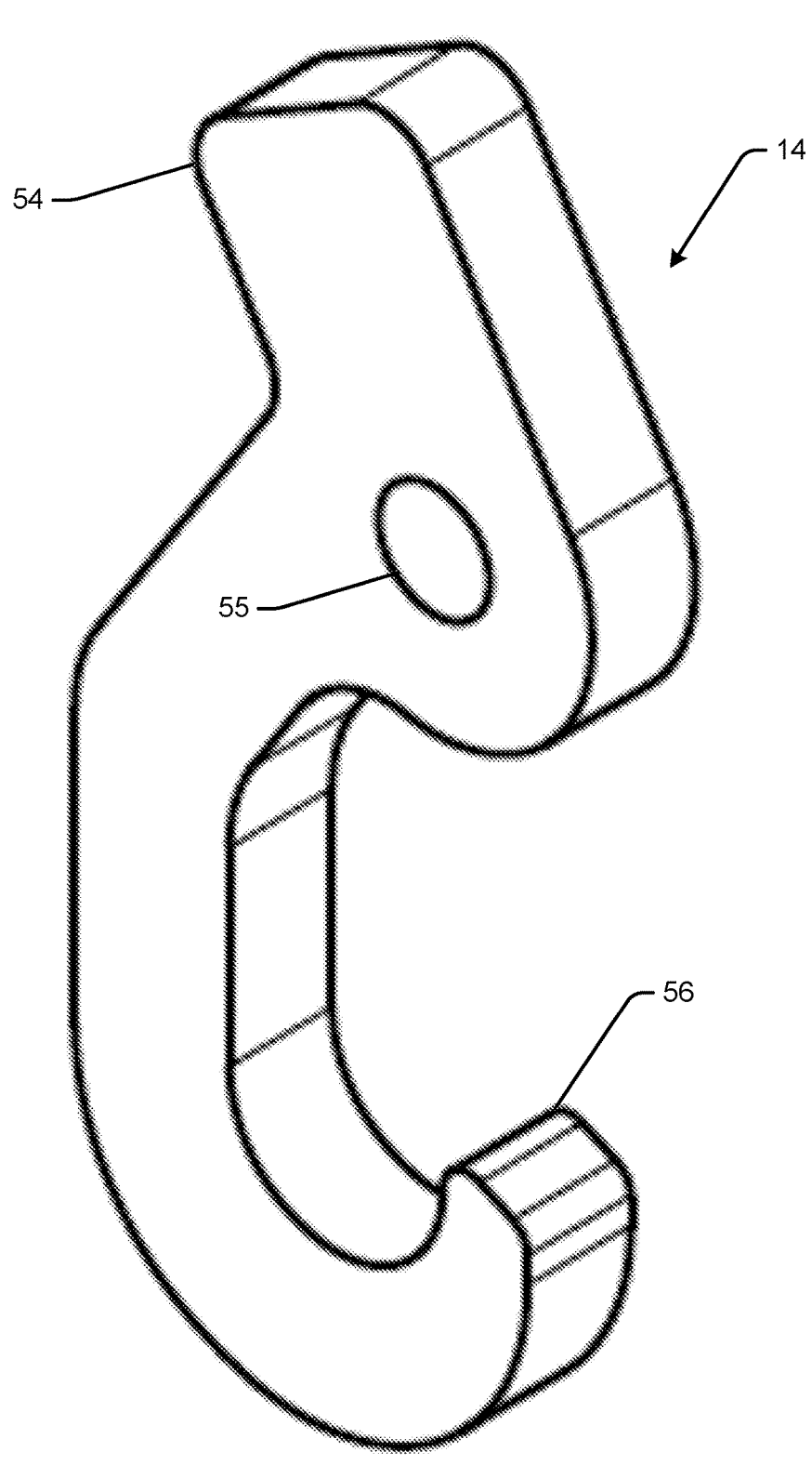
FIG. 9 is a perspective view showing an example latch of the example climbing device.

FIG. 9 is a perspective view showing an example latch 14 of the example climbing device 10. The example latch 14 can have a hook 56 that retains gate 12 across the mouth 30 of slot 18 when latch 14 is in the closed position. In an example, the latch 14 is mounted within the receiver opening 52. A nose 58 is formed adjacent to the receiver opening 52. Each leg of the gate or latch 14 is retained on opposite sides of the nose 58 as shown in FIG. 1. As such, the nose 58 limits the sideways motion of latch 14 when the gate is in the closed position.

Figure 10:
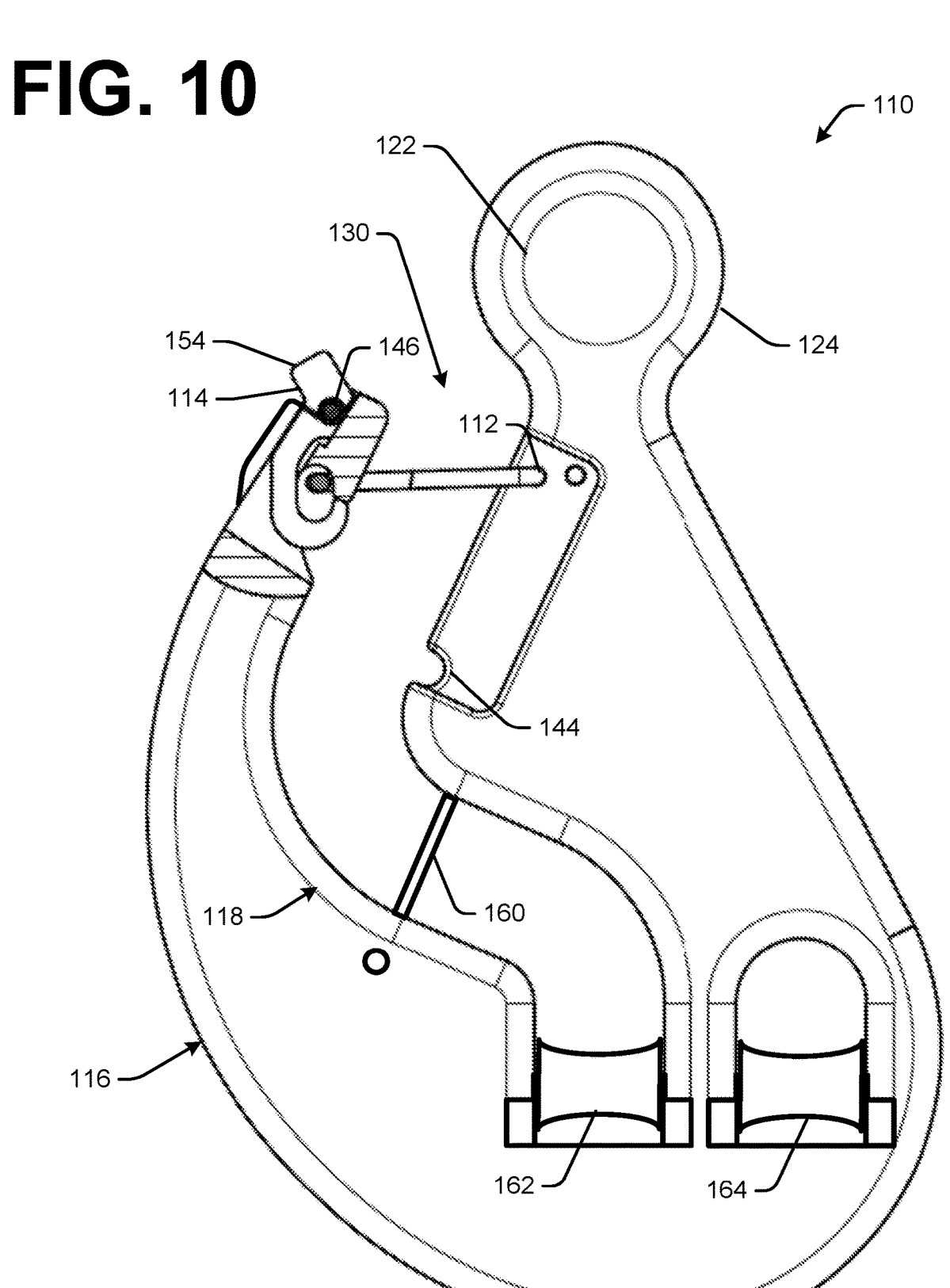
FIGS. 10-13 are side views showing other configurations of an example climbing device.
Figure 11:
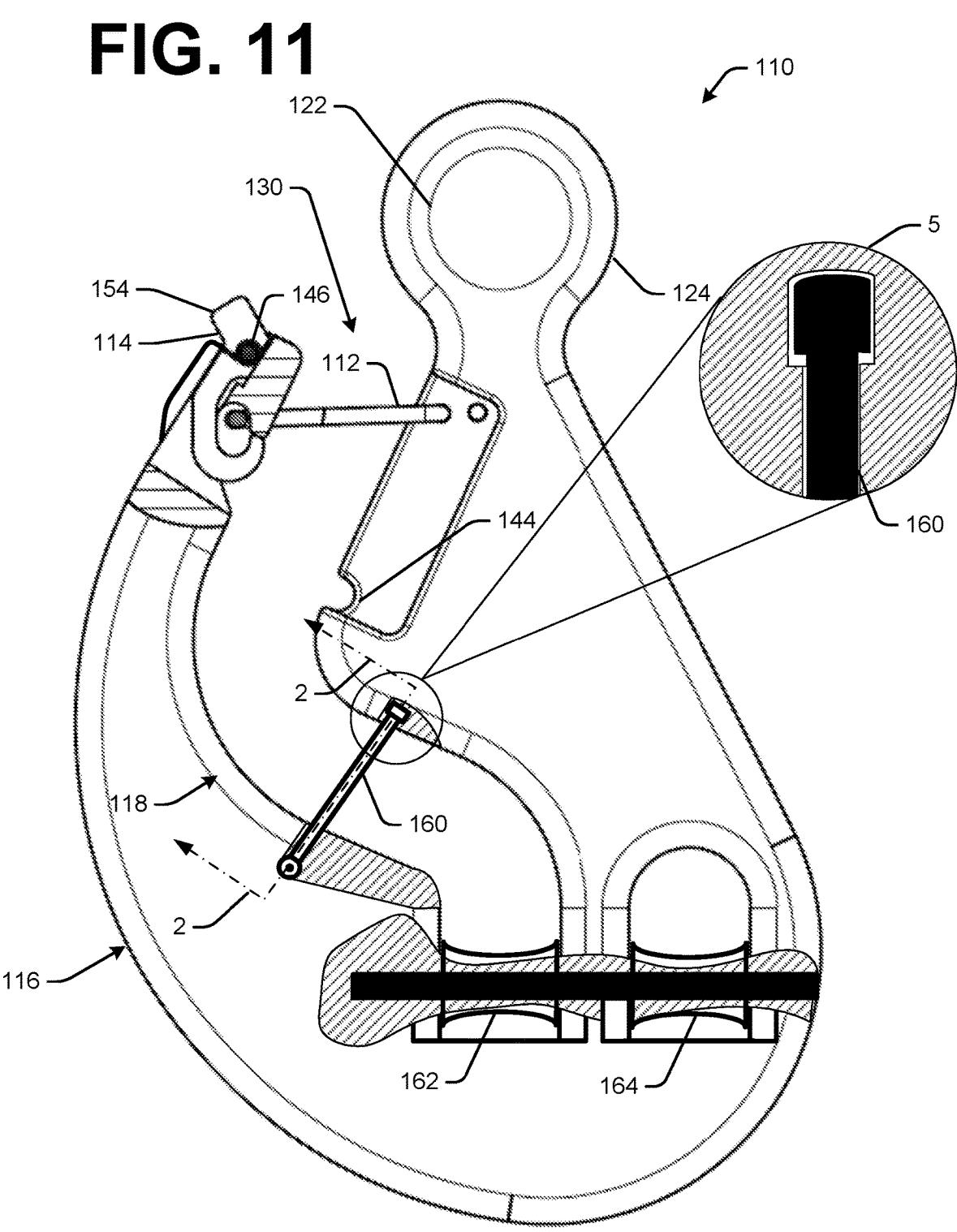

FIGS. 10-13 are side views showing other configurations of an example climbing devices 110, 210, and 310. FIG. 11 shows a partial cutaway corresponding to FIG. 10. In FIG. 11, an enlarged cross-sectional area 5 taken along lines 2-2 is also shown to illustrate engagement of the head of the auxiliary gate 160 in a cavity formed in the body 116 for receiving the head of the auxiliary gate 160. It is noted that the enlarged area 5 is shown perpendicular to the remainder of the drawing in FIG. 11 to show engagement of the head of auxiliary gate 160 within a cavity formed in the body 116 of the climbing device 110.

Figure 12:
Figure 13:
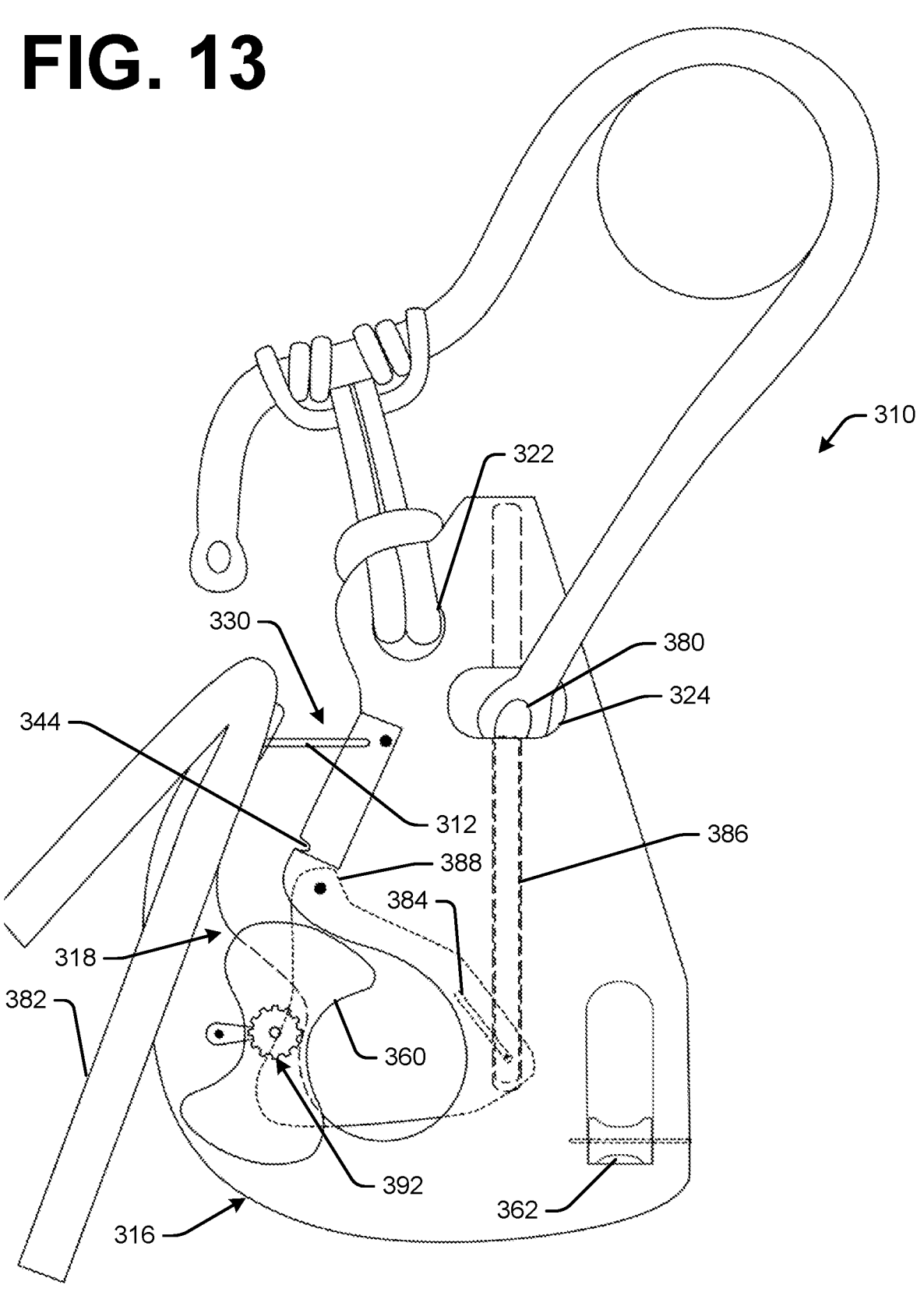

It is noted that in FIGS. 10 and 11, 100-series reference numbers are used to refer to like components already described above for FIGS. 1-9, as applicable. In FIG. 12, 200-series reference numbers are used to refer to like components already described above for FIGS. 1-9, as applicable. In FIG. 13, 300-series reference numbers are used to refer to like components already described above for FIGS. 1-9, as applicable. For the sake of brevity, these components may not be described again with reference to FIGS. 10-13.

The example climbing devices shown in FIGS. 10-13 include a second or auxiliary gate 160 (FIGS. 10 and 11),

260 (FIG. 12), and 360 (FIG. 13). In an example, an auxiliary gate is provided that spans a central portion of the slot. The auxiliary gate can be pivotally mounted on a second side of the slot. An example auxiliary gate has a head receivable within an auxiliary receiver formed in the unitary body on the first side of the slot (see, e.g., FIG. 11).

The climbing devices shown in FIGS. 10-13 also include roller sheeves 162 and 164 (FIGS. 10 and 11), 262 and 264 (FIG. 12) and 362 (FIG. 13). The roller sheeves may help reduce wear of the ropes and/or facilitate quicker insertion and removal of the ropes. In an example, a roller sheeve is mounted on an axle provided through a central axis of the roller sheeve in the rope resting portion of the slot. The roller sheeve can be mounted on an axle through a central axis of the roller sheeve in the secondary opening.

The climbing device 210 shown in FIG. 12 also includes at least one portion or region(s) 270a-f of the body 216 having a reduced material thickness. In an example, these regions 270a-f can be formed or molded into the body 216 during manufacture, or milled to subtract the alloy from these regions 270a-f. Reducing material thickness may be advantageous, for example, to reduce weight and/or provide an optimized weight for throwing the climbing device 210 up into the air around the tree branch during use.

In an example, at least one strengthener 272a-b can be added to the unitary body, as shown for purposes of illustration in FIG. 12. Including a strengthener can serve to strengthen the body having regions 270a-f of reduced material thickness, without adding back all of the weight removed by providing these regions 270a-f.

Figure 14:
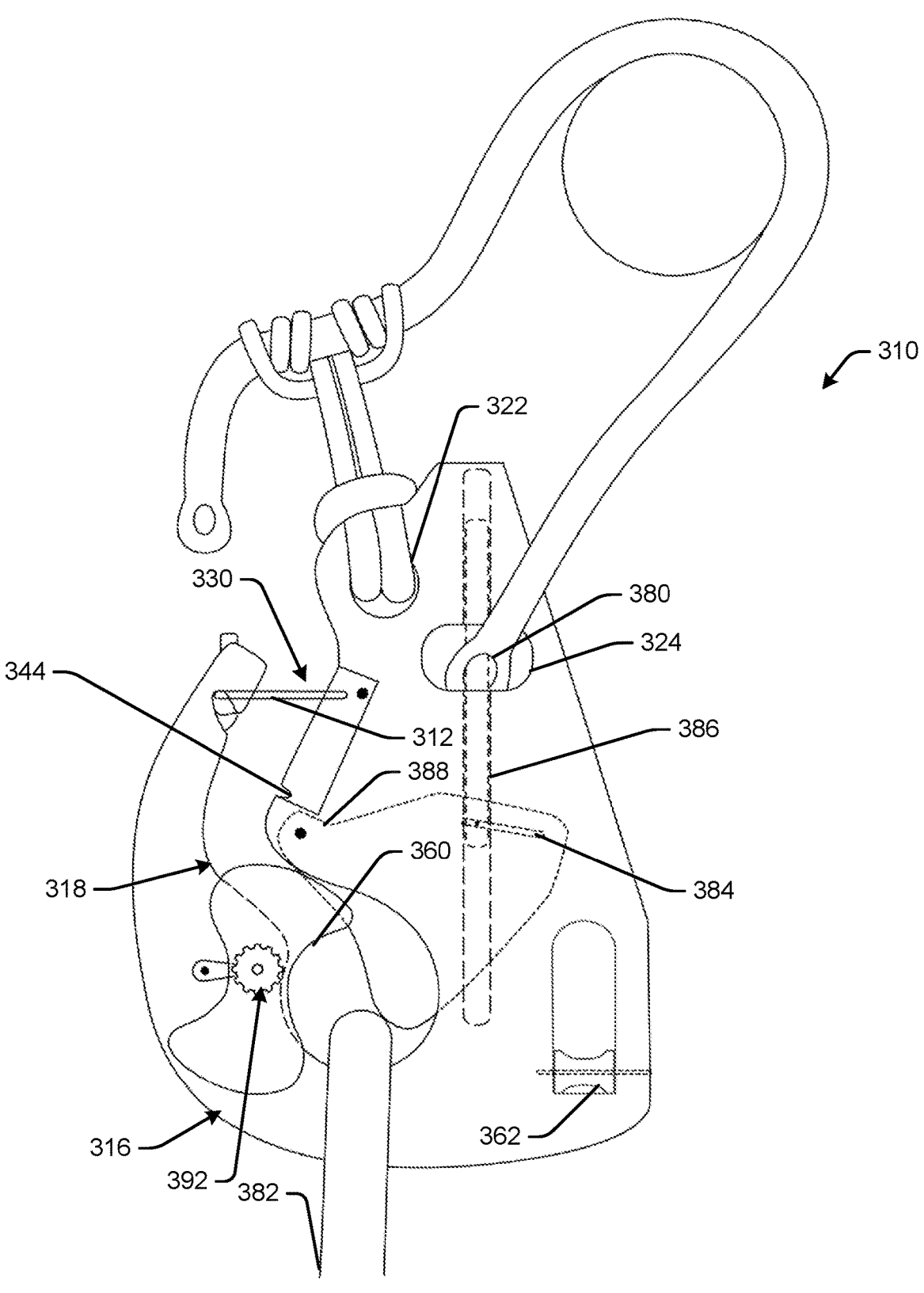
FIGS. 14-16 are side views illustrating operation of an example climbing device shown in FIG. 13.
Figure 15:
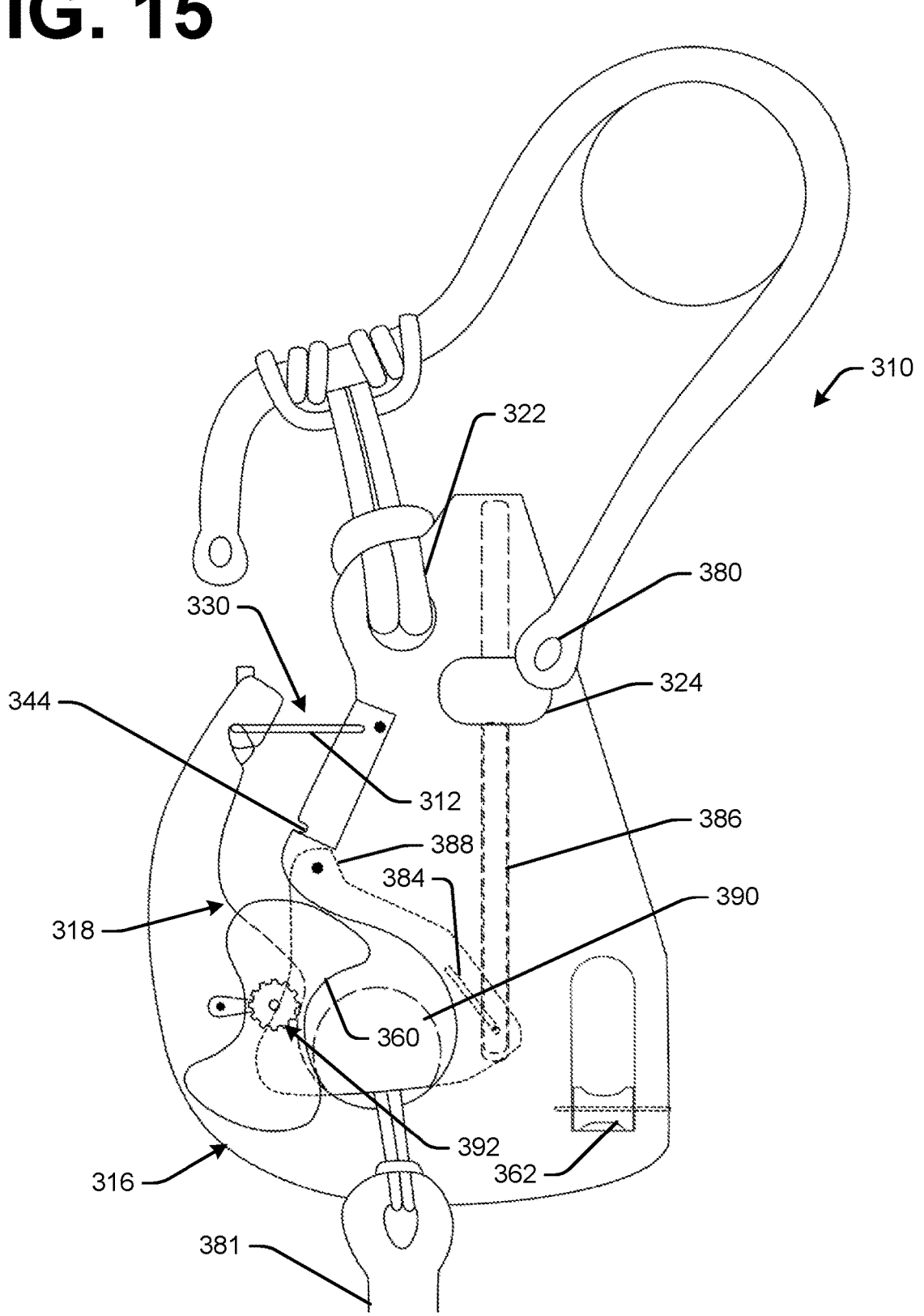
Figure 16:
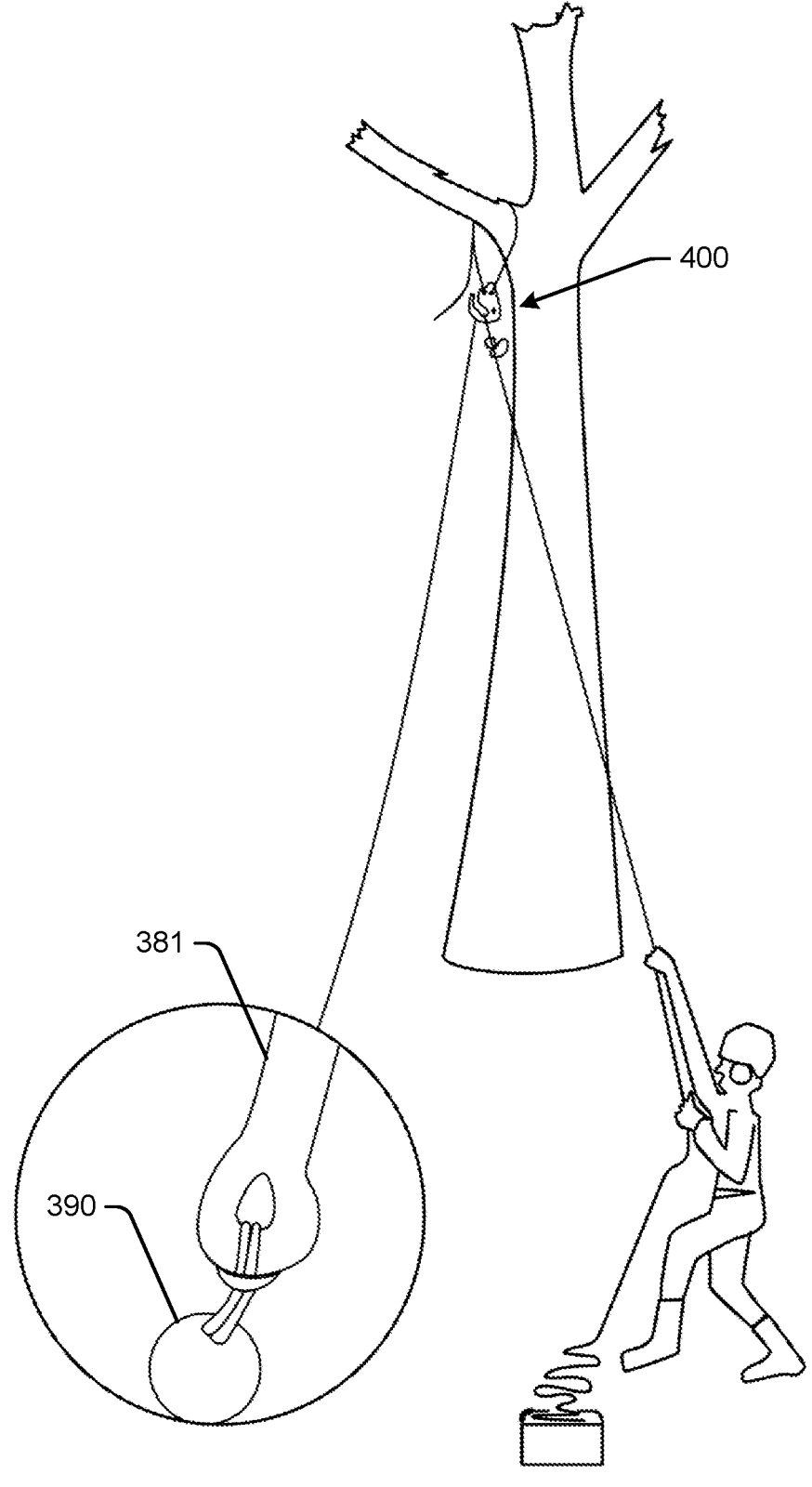

With reference to FIG. 13, and corresponding FIGS. 14-16 showing operation of the example climbing device 310 in FIG. 13, the Anchor is depicted here before trapping the leading eyelet 380 in the catch and release becket 324. Leading eyelet 380 is trapped by dropping the rope 382 into the wave slot. Once rope 382 is seated at the bottom of the wave, the safety trap and trap wing 360 and trap latch 384 will collapse and send the catch pin 386 through catch and release becket 324 and the leading eyelet 380. The auxiliary gate or trap wing 360 only travels one way and is locked from going back the other direction by a ratchet system 392. The trap wing 360 operates by turning in only one direction toward the bottom of the slot, e.g., as limited by a one-way ratchet on the pivot point of the trap wing 360.

Additionally after rope 382 has been set at the bottom of the wave as stated above, the safety gate lock 388 will engage, preventing the rope 382 to travel up the wave slot. This action effectively locks leading eyelet 380 into the catch/release becket 324 until the rope 382 is removed. Trap latch 384 is spring-loaded and rests in the position shown in this illustration. Instead of a spring-loaded safety gate (auxiliary gate) on the last drawings, this auxiliary gate only travels one way and is locked from going back the other direction by a ratchet system 392.

As seen in FIG. 14, after tying an acceptable knot on one side of the rope 382, the rope is secured and the apparatus is set for life support in an SRT configuration. Tying an acceptable knot is shown in FIG. 15.

As seen in FIG. 15, to retrieve the apparatus, one simply needs to secure a retrieval ball 390 to the working end of the rope side or end 381 (the side used by the climbers belay device) then pull down on the secured side, (the opposite side with the knot blocked). Once the end with the retrieval ball 390 pulls through the device 310, the traps release and catch the ball 390. The ball 390 attached to the rope side 381 subsequently pulls the now released leading eyelet 380 from the catch and release becket 324 and pull the whole apparatus from the T.I.P. to the ground.

FIG. 16 illustrates the retrieval from a ground up view, and installation of the retrieval ball 390. In an example, the climbing device 310 may be implemented to secure a safe working anchor point within the canopy of a tree or other place where safety from falling should be employed. The climbing device secures an anchor for a technique of rope climbing referred to by industry professionals as SRT climbing.

The example device 310 shown in FIG. 13 is based on the same working principles of the example device shown and described with reference to the preceding figures. The featured differences of the device in FIG. 13 include a catch and release becket, a safety trap and trap wing, a catch pin, and a gate lock. These components work together to eliminate the need for a carabiner, as part of the anchor apparatus. The result of the example device shown in FIG. 13 is a single device capable of all the described performance capabilities of the device in all other figures, with the added enhancements of being a less bulky apparatus, thus eliminating the carabiner posing a problem of getting stuck or loaded incorrectly.

The climbing device may be implemented in combination with a series of spliced and stitched rope cordage, in addition to a large profile captive eye carabiner. Or in the case of the example device in FIG. 13, no carabiner is needed. This combination, when configured correctly, can be used with a single length of rope (SRT line, in the tree climbers case). The SRT rope can be of a length, double the distance of the height of the particular anchor point. In other words, the rope travels from the ground to the climbing device anchor system and back to the ground.

The doubled length of rope enables the climber to retrieve the rope and the device from the ground by simply detaching their accent/descent system on the working side of the SRT line, then tying a single overhand knot, or in the case of the device in FIG. 13, a retrieval ball, and pulling on the opposite end of the rope. The overhand knot passes through the large profile captive eye carabiner and jam on the climbing device, causing the series of rope and cordage to pass over the anchor point or TIP, thus freeing the whole system to drop to the ground. In the case of FIG. 13, the exit of the rope from the device releases the series of traps, thus trapping the retrieval ball on the sides of the device and traps therein.

In an example, the climbing device enables the climber to install a cambium saving canopy anchor from the ground on an isolated TIP, while also enabling the climber to advance that anchor higher into the tree later if he/she wants to, without having to dismantle his/her belay setup. This creates a greater degree of safety and efficiency while working aloft in the tree.

Figure 17:
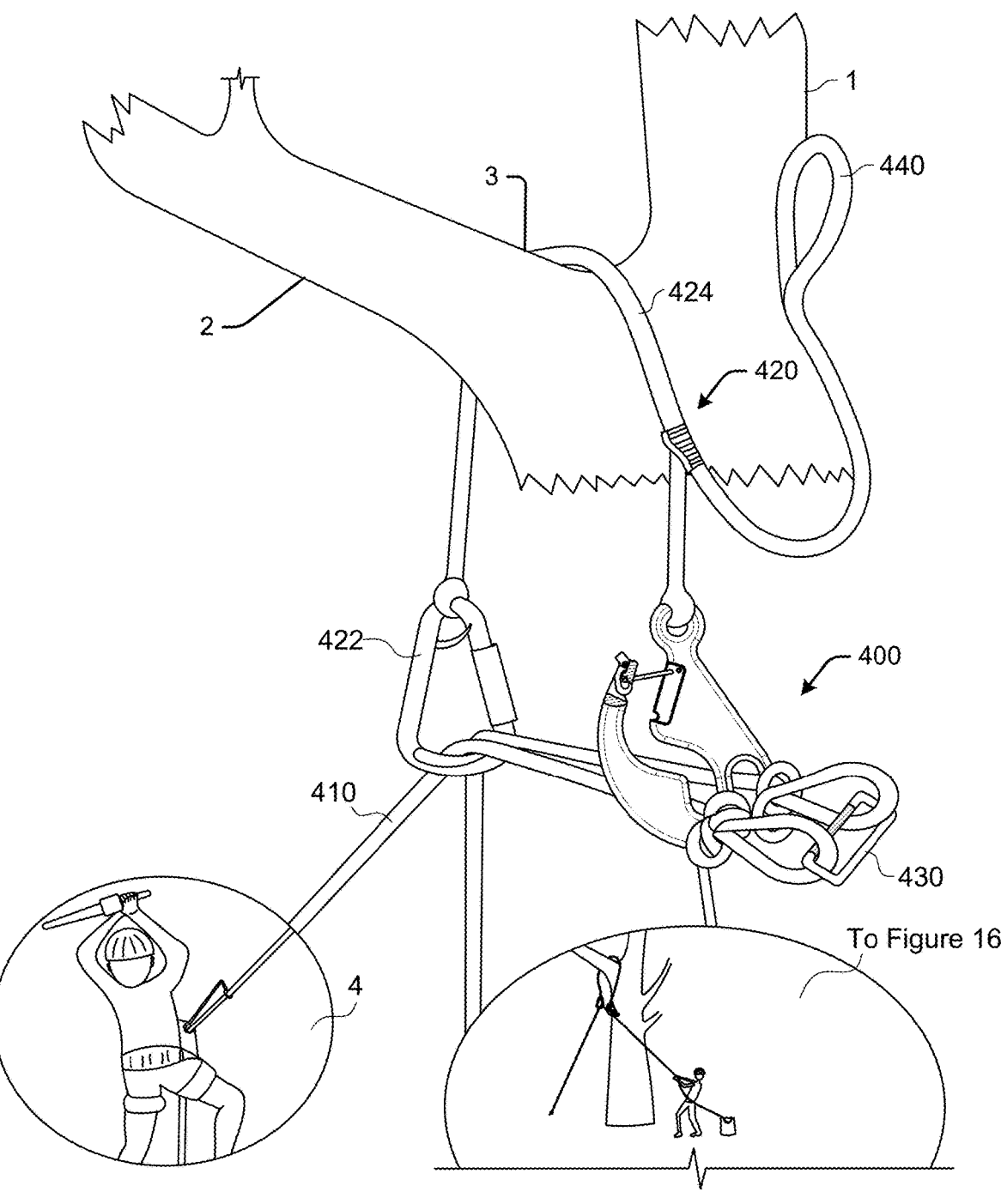
FIG. 17 shows an example configuration of the climbing device implemented as a canopy anchor as it has been passed over a branch and anchored at the base of the tree.
Figure 18:
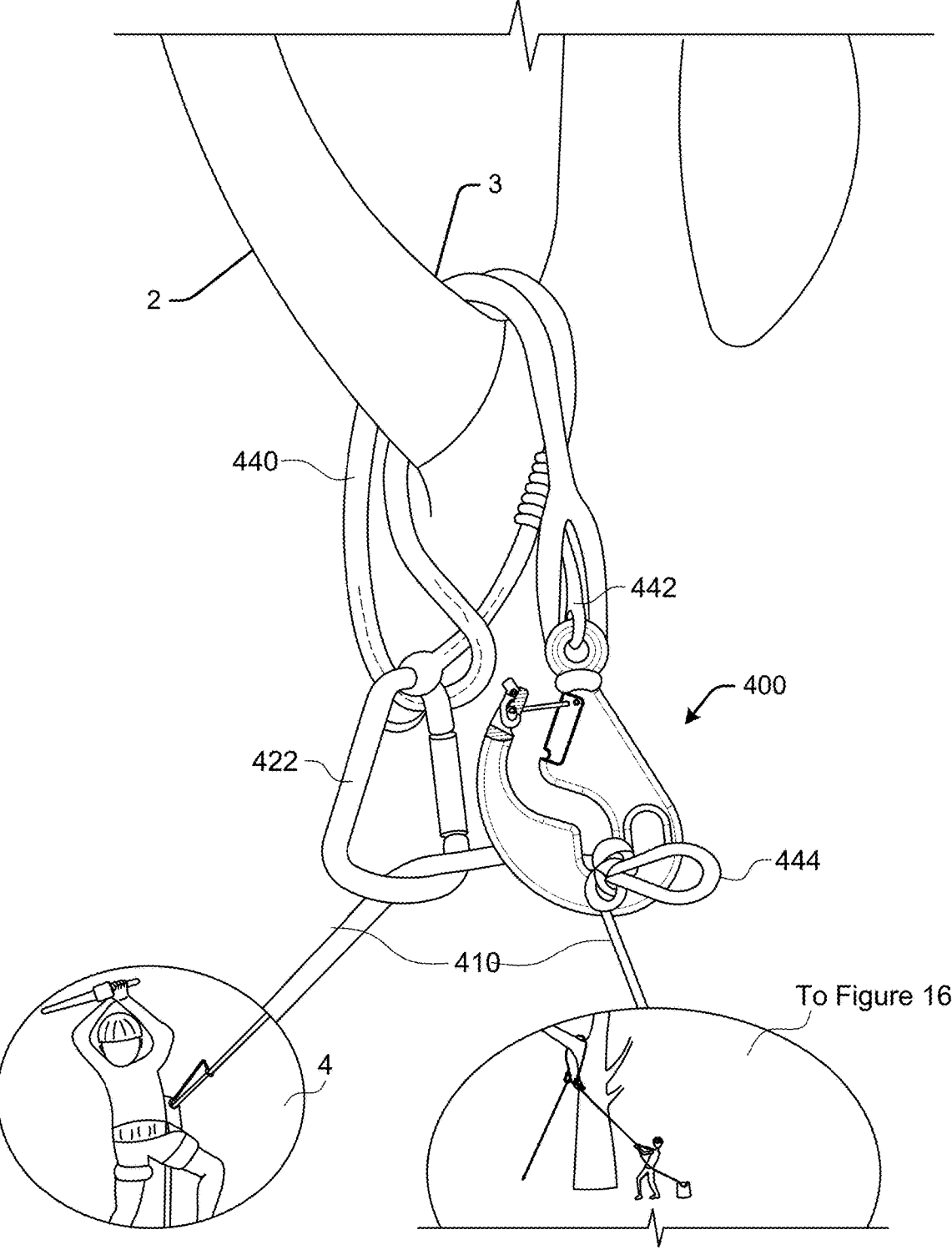
FIG. 18 shows another example configuration of the climbing device implemented as a canopy anchor as it has been passed over a branch and anchored at the base of the tree.
Figure 19:
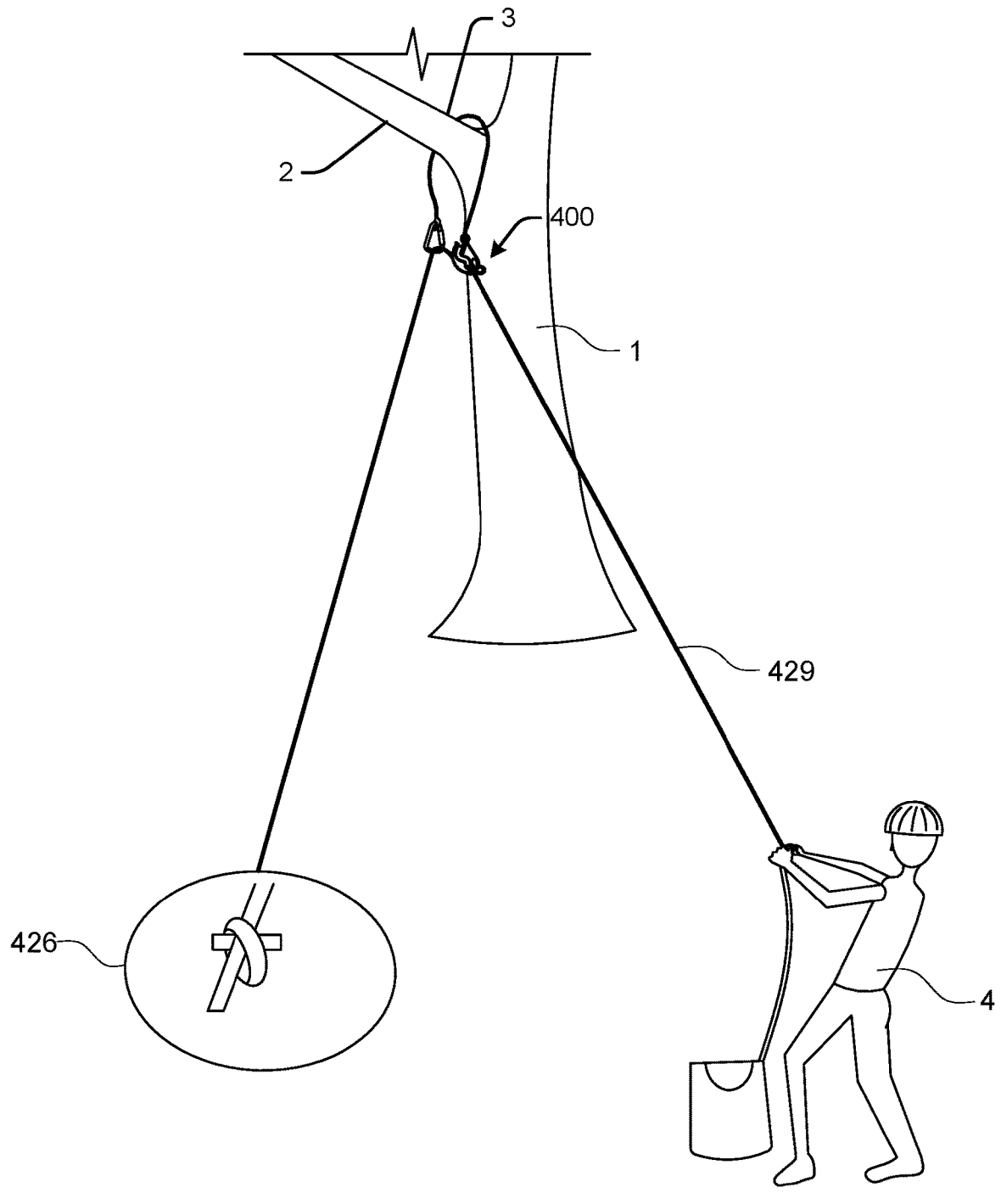
FIG. 19 illustrates retrieval of the climbing device from the tree.
Figure 20:
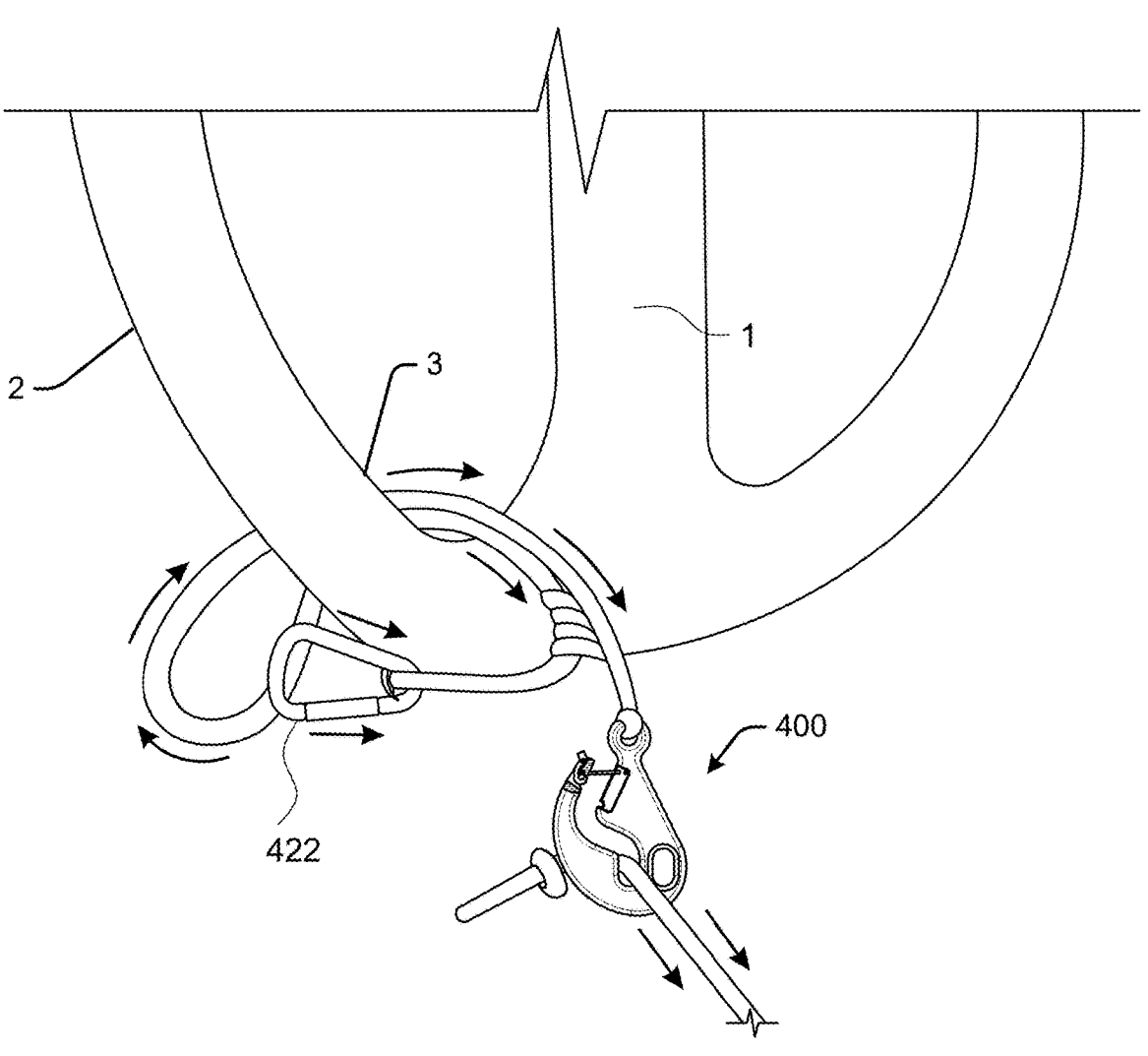
FIG. 20 is a close-up view corresponding to FIG. 19, illustrating retrieval of the climbing device from the tree.

FIG. 17 shows an example configuration of the climbing device 400 implemented as a canopy anchor for a tree 1 as it has been passed over a branch 2 of the tree 1 and anchored using a suitable knot blocked against the device. FIG. 18 shows another example configuration of the climbing device 400 implemented as a canopy anchor as it has been passed over a branch 2 and anchored using a suitable knot blocked against the device. FIG. 19 illustrates retrieval of the climbing device 400 from the tree 1. FIG. 20 is a close-up view corresponding to FIG. 19, illustrating retrieval of the climbing device 400 from the tree 1. It is noted that the climbing device 400 may be any configuration such as climbing devices, 10, 110, 210, or 310 and/or combinations or alternative configurations thereof.

Before continuing, it is noted that the operations shown and described herein are provided to illustrate example implementations. Furthermore, the operations are not limited to the ordering shown. Still other device configurations and operations may also be implemented in any suitable environment not limited to the tree canopy shown.

Accessing the tree with SRT can be accomplished using a base anchor system. The term "basal anchor" refers to a method where the rope travels from the ground up and over a high point in the tree 1, such as over a branch 2, and then passes back down through the tree 1 to the ground and is then fixed or anchored to the ground or the base of the tree 1 itself. The path of the rope may be such that it passes through and around different parts of the tree 1 before it reaches the TIP 3. Then on its path back towards the ground the rope may pass again through different areas of tree 1, thus creating a potentially devious path with many turns and contacting many parts of tree 1. This added friction to the rope can be felt upon pulling the line out of the tree 1 after the work is complete, but is not a problem while using the climbing device 400 disclosed herein, as will be described in more detail below.

After the climber has fixed the SRT line with a base anchor, he/she then ascends the line with their arms and legs secured by a belay device on the master point of their harness. The harness can travel up the rope freely and down the rope upon the climbers disengaging the belay device brake. The climber then ascends to the high point branch which the single rope is running over and back down to the ground. The climber can then install the climbing device 400 on the same branch or any suitable TIP, and then install the base anchored rope into the device by dropping the rope into the device at any point on the rope length desired, and then tying a suitable knot to effectively transition from a base anchored system to a canopy anchored system as seen in FIGS. 17 and 18, without having to dismantle his belay setup in order to pass the end of the rope through a device.

An additional SRT rescue or access line 410 may be passed through the hole in the climbing device 400 adjacent to the bottom of the slot. To secure this additional rope 410 the climber simply ties the same life safety knot as their main SRT belay line, on the same side of the climbing device 400 as the knot in their main SRT belay line, as seen for example in FIG. 17. To retrieve this line, the climber can either clip the knots together with a separate carabiner, or just leave the knot as is and perform the same retrieval method described for all the configurations, as seen for example in FIG. 19.

The ease of this setup is made possible because the climbing device 400 can be manually opened to accept a single climbing line acceptable to its designed diameter requirement. The climbing device 400 then automatically closes and locks, requiring multiple actions to open it again. The ease of setting up this anchor with the climbing device 10 is also due to the large profile carabiner on the opposite end of the climbing device rope around the TIP that will also accept the rope by the climber manually opening the gate and placing the rope inside. Once released, the gate closes, trapping the rope inside the carabiner and locking closed. The climber must tie a suitable safety knot into the climbing line to effectively jam onto the climbing device 400 and thus secure the rope passing from the knot through the climbing device 400 and the large profile carabiner to the climber and his/her belay system. The SRT line is now successfully anchored in the canopy (canopy anchor) of the tree 1. The climber did not have to dismantle his/her belay device at any point.

The climber can advance the climbing device 400 with ease by simply disengaging the locking mechanism on the large carabiner, or in the case of the device 310 in FIG. 13, simply remove the rope to release the anchor tether from the slot, and passing it back around the TIP and advancing it to the next desired point. While performing this advance, the climber does not have to completely detach the climbing device from the rope because the climbing device 400 can remain attached during the anchor advancement. While advancing the canopy anchor, it is common practice that the climber be secured via a lanyard or secondary life safety system.

Once the climber completes the work and descends to the ground, he/she is now ready to retrieve the climbing device 400 and rope(s) from the canopy of the tree 1. With conventional retrieval scenarios, the climber potentially has to fight major friction to retrieve the line. But with the climbing device 400 installed at the TIP in the canopy, of the tree 1, the climber does not have to fight as much friction because the rope is traveling through one (device 310 in FIG. 13) or two smooth alloy surfaces and back to the ground, instead of the back of the tree 1 and around a branch crotch. Not only is there less friction because of the climbing device 400 when pulling the line from the tree 1, but the climber is less likely to damage the tree 1 because the rope is not contacting the tree at the TIP and is instead passing through the climbing device 400 (or the device 310 in FIG. 13) and the large carabiner.

To retrieve the whole system, the climber ties a stopper knot (or a retrieval ball for the device 310 of FIG. 13) on the end of his/her rope. The climber begins to pull the line side, which travels up through the climbing device 400 (or the device 310 in FIG. 13), then the big carabiner, and finally back down to the ground where he/she has tied the stopper knot or retrieval ball. As the climber pulls the rope, in the case of FIG. 13, the rope pulls out of the climbing device and the traps release while simultaneously the retrieval ball cannot pass through the climbing device slot and subsequently pulls the whole apparatus and cordage from the TIP and out of the tree. In the case of the climbing device 400, the stopper knot is small enough to pass through the large carabiner, but too large to pass through the climbing device 400, which coincidentally pulls the climbing device 400 plus cord-and-large carabiner over the branch TIP and out of the tree 1.

Two example configurations of an anchor using the climbing device 400 are illustrated in FIG. 17 and in FIG. 18. Regardless of how the climber approaches his/her initial access into the tree 1, the canopy anchor with the climbing device 400 is always configured as it is shown in FIGS. 17 and 18. It is noted that the climber may choose a multiplicity of techniques to initially assess the TIP where the canopy anchor using the climbing device 400 will be secured.

To anchor as shown in FIG. 17, the climber 4 will place the anchor 420 including a large profile captive eye carabiner 422 attached by line 424 to the climbing device 400 (all preconfigured as one unit) around the TIP 3. The climber 4 then fashions a life-safety-knot 430 on his/her SRT line 410. The climber then passes the rope through the auto-locking gate and down into the slot of the climbing device 400. Then the rope 410 can be placed into the large profile captive eye carabiner 422. The climber 4 is now able to perform all work tasks in the tree 1 while being anchored by a SRT-cambium-saving-canopy-anchor-system.

To retrieve the climbing device canopy anchor system 420 and ropes the climber 4 simply ties a stopper knot 426 (e.g., single overhand or an equivalent knot), as seen for example in FIG. 19, and pulls on the rope (References 8 and 12). The rope is pulled on the side of the rope leading up to the midline knot-428. As the climber pulls the rope 429 in FIG. 19, the stopper knot 426 passes through the large profile captive eye carabiner 422 and jams on the climbing device 400, thus causing all components to fall to the ground for successfully retrieving the whole SRT rope 410 and anchor system 420.

A second configuration of the climbing device 400 is shown in FIG. 18. One difference of this configuration as opposed to the configuration described with reference to FIG. 17, is that on retrieval, instead of a carabiner 422 being pulled through the TIP 3 and potentially getting caught in a tight constriction, the climber 4 only pulls a loop of rope 440 through the TIP 3, as illustrated for example in FIG. 19.

During tree climbing operations involving rope systems, the tree climber must be careful when selecting and securing to a TIP 3 with any rope or hardware, if he/she wants to retrieve their gear without getting it stuck high up in the tree. There is often only one way to retrieve a stuck system and that is to have a whole separate climbing system at hand to access the tree again and remove the stuck system. Needless to say, getting any climbing system stuck in the tree is time consuming and expensive. This situation is one reason why tree climbers often remain working on the basal anchor system.

Retrieval of the climbing device 310 of FIG. 13 eliminates the problem of getting hardware or knots stuck while also reducing weight and bulk of the apparatus during setup and retrieval. To retrieve the climbing device the climber needs to attach a retrieval ball to the end of their rope of which side they just removed their belay device from. Then the climber pulls down on the opposite side of the rope leading up to the midline stopper knot against the climbing device. As the climber continues to pull the rope down, the end of the rope with the retrieval ball will pull out of the climbing device, which subsequently releases the series of traps securing the anchor apparatus to the TIP. The traps release without getting stopped by the retrieval ball cord because of the geometrical shape of the trap wings. Once the trap wings are rested in their biased positions, the catch pin releases the anchor tethers (leading eye) passing around the TIP. Because the retrieval ball cannot pass through the device slot, the rope with retrieval ball pulls the whole device and cordage from around the branch TIP and out of the tree, thus successfully retrieving the whole apparatus and SRS/SRT system.

The configuration shown in FIGS. 18 and 19 relieves the problem of getting hardware or knots stuck in the tree when retrieving the canopy anchor system from the TIP. The climber 4 installs the climbing device canopy anchor climbing device 400 by first slipping the standard spliced eye 440 through the climbing device 400, and then cinching it onto the device 420 forming a girth hitch, as shown in FIG. 18. The climber 4 then adjusts the prusik knot 442 on the anchor cord 440 and forms a loop to pass over the TIP 3. The climber then places the large profile captive eye carabiner 422 through the loop of standard spliced eye 440. Finally, the climber 4 repeats the steps described in FIG. 17 for setting up their climbing line 4 into the climbing device 400 and large profile captive eye carabiner 422, tying the life safety knot 444, and finally performing their work in the tree 3 while anchored by an SRT cambium-saving canopy anchor system.

To retrieve the SRT rope system and anchor 420 in the second configuration (FIGS. 18 and 19) the process is as previously described with reference to FIG. 17. It should be noted that to assist retrieval of the climbing device 400 in the second configuration, the anchor cord 440 may be spliced with added rigidity to relieve the tendency to pin the large profile captive eye carabiner 422 against the tree 3 when retrieving the lines. Conversely the standard spliced eye may be spliced to be supple, so as to cinch down on the climbing device 400.

It is noted that the examples shown and described are provided for purposes of illustration and are not intended to be limiting. Still other examples are also contemplated.

The invention claimed is:

1. A climbing device for providing a canopy anchor for a tree, the climbing device comprising:
a unitary body;
an eyelet formed through an upper body portion of the unitary body for attaching a first rope;
a secondary opening formed through a lower body portion of the unitary body for attaching a second rope;
a slot formed in the unitary body for receiving a third rope, the slot defined by a mouth of the slot leading an upper curved portion leading to a lower curved portion leading to a rope resting portion for the third rope; and
a gate for closing across the mouth of the slot;
wherein the unitary body is loaded upon its major axis thus positioning the third rope within the rope resting portion of the slot for use as the canopy anchor when passed over a branch of the tree and anchored at a base of the tree.

2. The climbing device of claim 1, wherein the gate is a spring gate having a first leg offset from a second leg, the offset of the first and second legs biasing the spring gate in an open position adjacent to the mouth of the slot.

3. The climbing device of claim 2, further comprising a detent formed in the unitary body, the detent configured to receive the gate when the gate is in an open position.

4. The climbing device of claim 2, wherein the first and second legs of the spring gate are mounted on a first side of the mouth of slot adjacent to the eyelet.

5. The climbing device of claim 4, further comprising a latch pivotally mounted on a second side of the mouth of the slot, the latch pivotally mounted on a pin to rotate between an open position and a closed position, the latch having a hook to retain the spring gate across the mouth of the slot when the latch is in the closed position.

6. The climbing device of claim 5, wherein the latch has a spring to bias the latch in the closed position.

7. The climbing device of claim 6, wherein the latch has a lever to manually rotate the latch against the bias of the spring to move the latch into the open position and release the gate.

8. The climbing device of claim 5, wherein the latch is mounted within a receiver opening.

9. The climbing device of claim 8, further comprising a nose formed adjacent to the receiver opening, wherein each leg of the gate is retained on opposite sides of the nose, the nose thereby limiting sideways motion of the gate.

10. The climbing device of claim 1, further comprising a roller sheeve mounted on an axle through a central axis of the roller sheeve in the rope resting portion of the slot.

11. The climbing device of claim 1, further comprising a roller sheeve mounted on an axle through a central axis of the roller sheeve in the secondary opening.

12. The climbing device of claim 1, further comprising an auxiliary gate spanning a central portion of the slot.

13. The climbing device of claim 12, wherein the auxiliary gate is pivotally mounted on a second side of the slot.

14. The climbing device of claim 13, wherein the auxiliary gate has a head receivable within an auxiliary receiver formed in the unitary body on the first side of the slot.

15. The climbing device of claim 1, further comprising at least one portion of the unitary body having a reduced material thickness.

16. The climbing device of claim 1, further comprising at least one strengthener added to the unitary body.

17. A climbing device comprising:
a body structure;
an eyelet formed through an upper body portion of the body structure for attaching a first rope;
a secondary opening formed through a lower body portion of the body structure for attaching a second rope;
a slot formed in the body structure for receiving a third rope, the slot defined by a mouth of the slot leading an upper curved portion leading to a lower curved portion leading to a rope resting portion for the third rope; and
a gate for closing across the mouth of the slot;
wherein the body structure is loaded upon its major axis thus positioning the third rope within the rope resting portion of the slot.

* * * * *